(12) United States Patent     (10) Patent No.:     US 12,626,201 B2

Chobe et al.     (45) Date of Patent:     May 12, 2026

---

(54) SYSTEM AND METHOD FOR CONVERTING A TIME-OFF REQUEST OF AN AGENT TO A SHIFT-TRADE WITH ANOTHER AGENT OR TO A SELF-SWAP SCHEDULE

(71) Applicant: NICE LTD., Ra'anana (IL)

(72) Inventors: Vaibhav Chobe, Pune (IN); Priyanka Padalalu, Pune (IN); Ojas Pitre, Mumbai (IN)

(73) Assignee: NICE LTD., Ra'anana (IL)

( * ) Notice: Subject to any disclaimer, the term of this patent is extended or adjusted under 35 U.S.C. 154(b) by 347 days.

(21) Appl. No.: 17/739,120

(22) Filed: May 8, 2022

(65) Prior Publication Data

US 2023/0359961 A1     Nov. 9, 2023

(51) Int. Cl.
*G06Q 10/0631*     (2023.01)
*G06F 16/903*     (2019.01)
*G06F 16/9038*     (2019.01)

(52) U.S. Cl.
CPC ................ *G06Q 10/063116* (2013.01); *G06F 16/90335* (2019.01); *G06F 16/9038* (2019.01)

(58) Field of Classification Search
CPC ....... G06Q 10/063116; G06F 16/90335; G06F 16/9038
See application file for complete search history.

(56) References Cited

U.S. PATENT DOCUMENTS

| | | | |
|---|---|---|---|
| 8,788,308 B1 * | 7/2014 | Cox ................... | G06Q 10/0631 705/7.17 |
| 10,535,024 B1 * | 1/2020 | Westland ....... | G06Q 10/063116 |
| 11,010,699 B1 * | 5/2021 | Lu ........................ | G06F 3/04842 |
| 2005/0096962 A1 * | 5/2005 | Narasimhan ... | G06Q 10/063116 705/7.21 |
| 2005/0177407 A1 * | 8/2005 | Barni ..................... | G06Q 10/06 705/7.14 |

(Continued)

OTHER PUBLICATIONS

NICE Reports a Surge in Usage of Self-Service Scheduling to Accommodate Rapid Shift-Swap and Extra Hours Due to COVID-19 Business Wire [New York] Mar. 31, 2020.*

(Continued)

*Primary Examiner* — Timothy Padot

(74) *Attorney, Agent, or Firm* — SOROKER AGMON NORDMAN RIBA

(57)     ABSTRACT

A computerized-system for converting a time-off request of an agent to a shift-trade with another agent or to a self-swap schedule, in a contact center is provided here in. Upon receiving a time-off request from a source-agent, operating a Time-off Convertor (TC) module. The TC module includes (i) searching open trade requests in dates where the source-agent doesn't have a scheduled-shift, to yield a list-of-trading-agents; (ii) retrieving from the yielded list-of-trading-agents, compatible-agents who do not have a scheduled-shift in the specified date; (iii) presenting the compatible-agents, via a display unit; (iv) enabling the source-agent a selection of an agent from the presented compatible-agents and upon selection of the agent by the source-agent, sending an approval request to the agent; and (v) upon acceptance of the agent, sending to the source-agent and to the agent a trade-success-notification, and operating change of scheduled shifts in one or more WFM MSs.

9 Claims, 7 Drawing Sheets

(56)     References Cited

U.S. PATENT DOCUMENTS

| | | | |
|---|---|---|---|
| 2006/0224477 A1* | 10/2006 | Garcia | .................. G06Q 20/10 |
| | | | 705/32 |
| 2008/0082387 A1* | 4/2008 | Tewari | .......... G06Q 10/063112 |
| | | | 705/7.14 |

OTHER PUBLICATIONS

Uhde, Alarith, et al. "Fairness and decision-making in collaborative shift scheduling systems." Proceedings of the 2020 CHI conference on human factors in computing systems. 2020.*

* cited by examiner

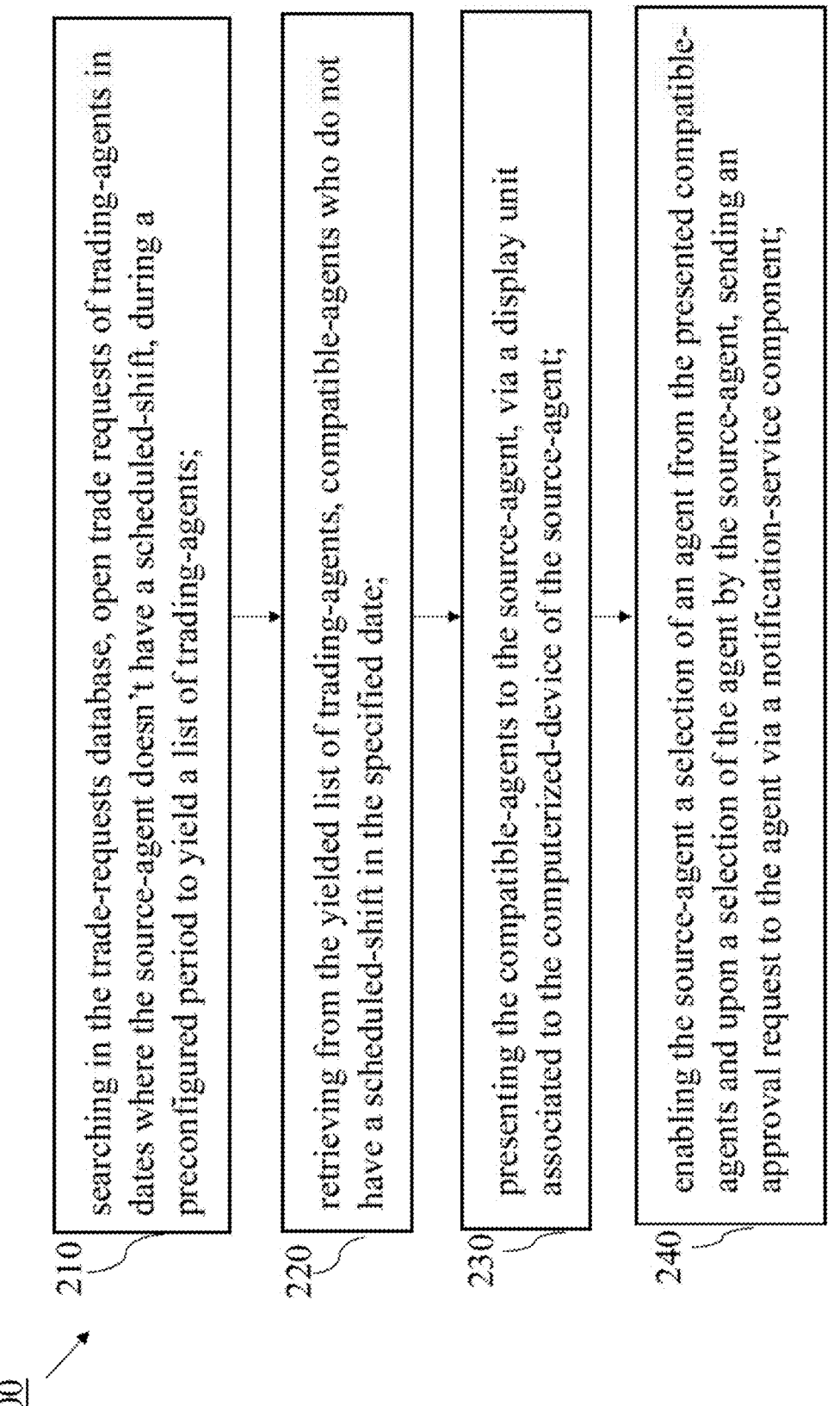

210 — searching in the trade-requests database, open trade requests of trading-agents in dates where the source-agent doesn't have a scheduled-shift, during a preconfigured period to yield a list of trading-agents;

220 — retrieving from the yielded list of trading-agents, compatible-agents who do not have a scheduled-shift in the specified date;

230 — presenting the compatible-agents to the source-agent, via a display unit associated to the computerized-device of the source-agent;

240 — enabling the source-agent a selection of an agent from the presented compatible-agents and upon a selection of the agent by the source-agent, sending an approval request to the agent via a notification-service component;

250 upon acceptance of the agent, sending to the computerized-device of the source-agent and to a computerized-device of the agent a trade-success-notification, via the notification-service component to be presented on the display unit and operating change of scheduled shifts to the source-agent and the agent in one or more Workforce Management (WFM) MSs.

Figure 2B

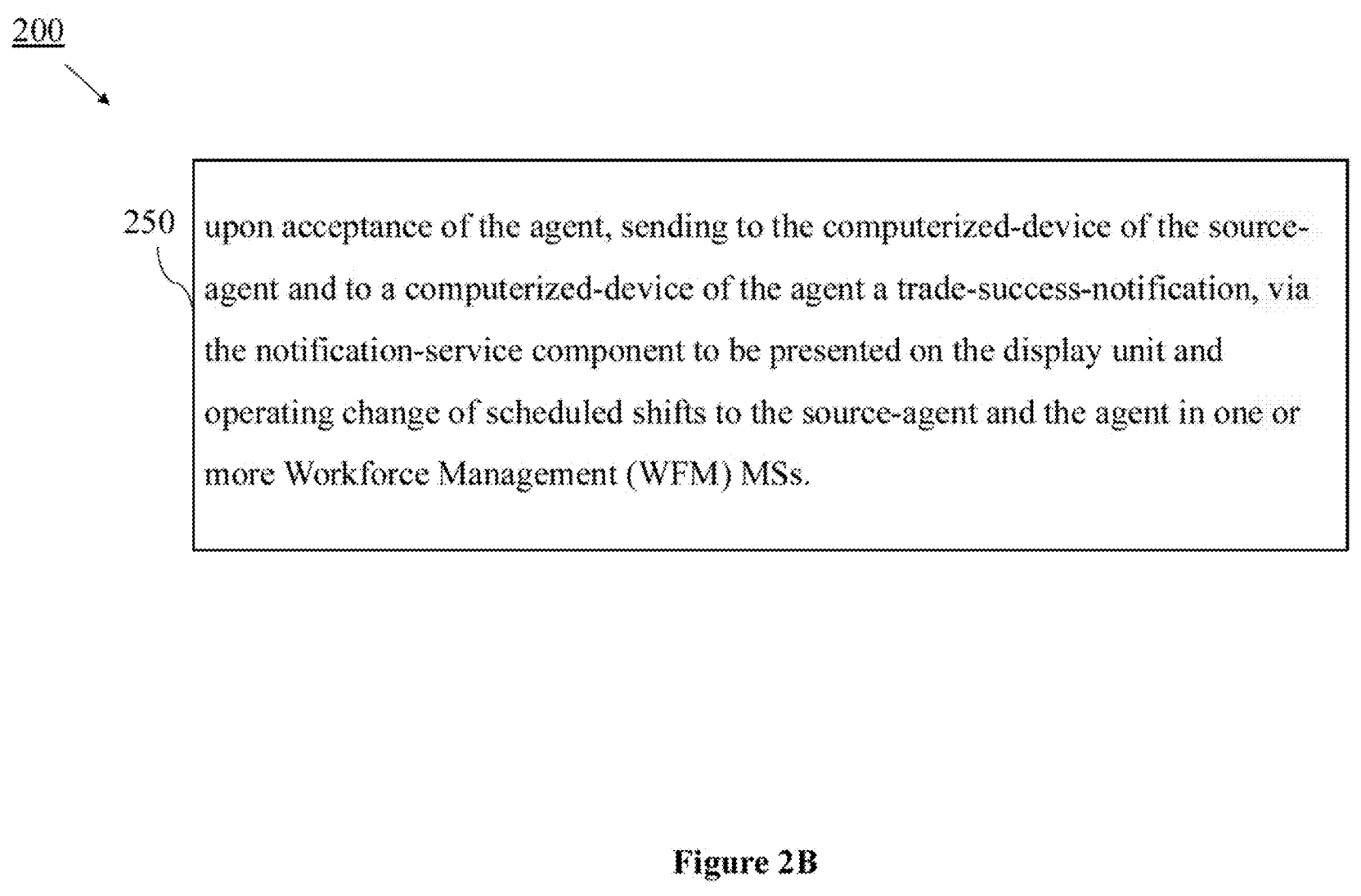

| Request No | agent | Start Time | End Time | Status | agent | start time | end time |
|---|---|---|---|---|---|---|---|
| 1 | John | 25/12/2021 09:00:00 | 25/12/2021 18:00:00 | OPEN | Harry | 24/12/2021 09:00:00 | 24/12/2021 18:00:00 |
| 2 | John | 25/12/2021 09:00:00 | 25/12/2021 18:00:00 | OPEN | Barry | 26/12/2021 09:00:00 | 26/12/2021 18:00:00 |
| 3 | John | 25/12/2021 09:00:00 | 25/12/2021 18:00:00 | OPEN | Nathan | 24/12/2021 09:00:00 | 24/12/2021 18:00:00 |
| 4 | Smith | 26/12/2021 09:00:00 | 26/12/2021 18:00:00 | OPEN | Mosty | 27/12/2021 09:00:00 | 27/12/2021 18:00:00 |
| 5 | Smith | 26/12/2021 09:00:00 | 26/12/2021 18:00:00 | OPEN | Iftach | 27/12/2021 09:00:00 | 27/12/2021 18:00:00 |
| 6 | Smith | 26/12/2021 09:00:00 | 26/12/2021 18:00:00 | OPEN | Oren | 27/12/2021 09:00:00 | 27/12/2021 18:00:00 |
| 7 | Smith | 26/12/2021 09:00:00 | 26/12/2021 18:00:00 | OPEN | Alon | 27/12/2021 09:00:00 | 27/12/2021 18:00:00 |
| 8 | Smith | 26/12/2021 09:00:00 | 26/12/2021 18:00:00 | OPEN | Tod | 27/12/2021 09:00:00 | 27/12/2021 18:00:00 |
| 9 | Andy | 29/12/2021 09:00:00 | 29/12/2021 18:00:00 | OPEN | Tom | 24/12/2021 09:00:00 | 24/12/2021 18:00:00 |
| 10 | Andy | 29/12/2021 09:00:00 | 29/12/2021 18:00:00 | OPEN | Mark | 24/12/2021 09:00:00 | 24/12/2021 18:00:00 |
| 11 | Andy | 29/12/2021 09:00:00 | 29/12/2021 18:00:00 | OPEN | Adam | 28/12/2021 09:00:00 | 28/12/2021 18:00:00 |
| 12 | Andy | 29/12/2021 09:00:00 | 29/12/2021 18:00:00 | OPEN | Brian | 28/12/2021 09:00:00 | 28/12/2021 18:00:00 |
| 13 | Nick | 25/12/2021 09:00:00 | 25/12/2021 18:00:00 | OPEN | Tamir | 26/12/2021 09:00:00 | 26/12/2021 18:00:00 |
| 14 | Nick | 25/12/2021 09:00:00 | 25/12/2021 18:00:00 | OPEN | Liron | 26/12/2021 09:00:00 | 26/12/2021 18:00:00 |
| 15 | Nick | 25/12/2021 09:00:00 | 25/12/2021 18:00:00 | OPEN | Tony | 26/12/2021 09:00:00 | 26/12/2021 18:00:00 |
| 16 | Nick | 25/12/2021 09:00:00 | 25/12/2021 18:00:00 | OPEN | Chris | 26/12/2021 09:00:00 | 26/12/2021 18:00:00 |
| 17 | Nick | 25/12/2021 09:00:00 | 25/12/2021 18:00:00 | OPEN | Mark | 26/12/2021 09:00:00 | 26/12/2021 18:00:00 |
| 18 | Brandi | 27/12/2021 09:00:00 | 27/12/2021 18:00:00 | CLOSED | Peter | 25/12/2021 09:00:00 | 25/12/2021 18:00:00 |
| 19 | Brandi | 27/12/2021 09:00:00 | 27/12/2021 18:00:00 | CLOSED | Nathan | 25/12/2021 09:00:00 | 25/12/2021 18:00:00 |

SYSTEM AND METHOD FOR CONVERTING A TIME-OFF REQUEST OF AN AGENT TO A SHIFT-TRADE WITH ANOTHER AGENT OR TO A SELF-SWAP SCHEDULE

TECHNICAL FIELD

The present disclosure relates to the field of data analysis and more specifically, to converting a time-off request of an agent to a shift-trade with another agent or to a self-swap schedule.

BACKGROUND

In a contact center, scheduled agents are entitled to request time-off in case of an unexpected unavailability. Also, agents have to utilize their predefined paid time-off balances, such as sick, personal, vacation, Paid Time Off (PTO) and the like or unpaid time-off in case their balance has been exhausted.

In current technical solutions when an agent raises a time-off request, then a user, such as a supervisor has to put manual efforts to manage the agent's time-off request and to adjust a possible understaffing situation. Also, agents in need for time-off might be unaware of existing trade requests of other agents or schedule swap opportunities which may be available for them.

Accordingly, there is a need for a system and method for converting a time-off request of an agent to a shift-trade with another agent or to a self-swap schedule. Thus, enabling agents to utilize existing open trade or swap opportunities instead of exhausting their time-off balances.

SUMMARY

There is thus provided, in accordance with some embodiments of the present disclosure, a computerized-system for converting a time-off request of an agent to a shift-trade with another agent or to a self-swap schedule, in a contact center. The computerized-system includes one or more processors; a trade-requests database and a memory to store the database thereto. The trade-requests database is associated with one or more Engagement Manager (EM) Micro Services (MS)s;

Furthermore, in accordance with some embodiments of the present disclosure, upon receiving a time-off request for a specified date via a Graphical User Interface (GUI) that is associated with an Engagement Manager (EM) application that is running on a computerized-device of a source-agent, the one or more processors may be configured to operate a Time-off Convertor (TC) module. A source-agent is an agent that is sending a time-off request.

Furthermore, in accordance with some embodiments of the present disclosure, the TC module may include: (i) searching in the trade-requests database, open trade requests of trading-agents in dates where the source-agent doesn't have a scheduled-shift, during a preconfigured period to yield a list of trading-agent; (ii) retrieving from the yielded list of trading-agents, compatible-agents who do not have a scheduled-shift in the specified date; (iii) presenting the compatible-agents to the source-agent, via a display unit associated to the computerized-device of the source-agent; (iv) enabling the source-agent a selection of an agent from the presented compatible-agents and upon selection of the agent by the source-agent, sending an approval request to the agent via a notification-service component; and (v) upon acceptance of the agent, sending to the computerized-device of the source-agent and to a computerized-device of the agent a trade-success-notification, via the notification-service component to be presented on the display unit and operating change of scheduled shifts to the source-agent and the agent in one or more Workforce Management (WFM) MSs. The EM application may be communicating with one or more EM Micro Service (MS)s.

Furthermore, in accordance with some embodiments of the present disclosure, when no compatible-agents have been retrieved, the TC module may be further configured to present to the source-agent via the display unit one or more options for selection.

Furthermore, in accordance with some embodiments of the present disclosure, compatible-agents are agents having preconfigured parameters in the EM application.

Furthermore, in accordance with some embodiments of the present disclosure, an option of the one or more options is schedule-swap of shifts and when the schedule-swap is selected by the source-agent via the GUI, searching one or more shifts during a preconfigured period which are understaffed, and the source-agent is not scheduled to and presenting the one or more shifts to the source-agent via the display unit for schedule-swap selection. Upon selection of the source-agent via the GUI, the TC module may comprise operating change of shifts to the source-agent in the one or more WFM MSs.

Furthermore, in accordance with some embodiments of the present disclosure, an option of the one or more options may be to initiate a new trade-request.

Furthermore, in accordance with some embodiments of the present disclosure, an option of the one or more options is taking time-off, and upon selection of the source-agent via the GUI, the TC module may comprise removing the scheduled-shift from the one or more WFM MSs.

There is further provided, in accordance with some embodiments of the present disclosure, a computerized-method for converting a time-off request of an agent to a shift-trade with another agent or to a self-swap schedule, in a contact center.

Furthermore, in accordance with some embodiments of the present disclosure, in a computerized-system that includes one or more processors, a trade-requests database and a memory to store the database thereon, the trade-requests database may be associated to a one or more Engagement Manager (EM) Micro Services (MS)s.

Furthermore, in accordance with some embodiments of the present disclosure, upon receiving a time-off request for a specified date via a Graphical User Interface (GUI) that is associated with an Engagement Manager (EM) application that is running on a computerized-device of a source-agent, the one or more processors may be configured to operate a Time-off Convertor (TC) module as described above. A source-agent is an agent that is sending a time-off request.

BRIEF DESCRIPTION OF THE DRAWINGS

FIGS. 2A-2B are a high-level workflow of a Time-off Convertor (TC) module, in accordance with some embodiments of the present disclosure;

FIG. 5 shows an example of open trade requests of trading-agents, in accordance with some embodiments of the present disclosure.

DETAILED DESCRIPTION

Figure 1:
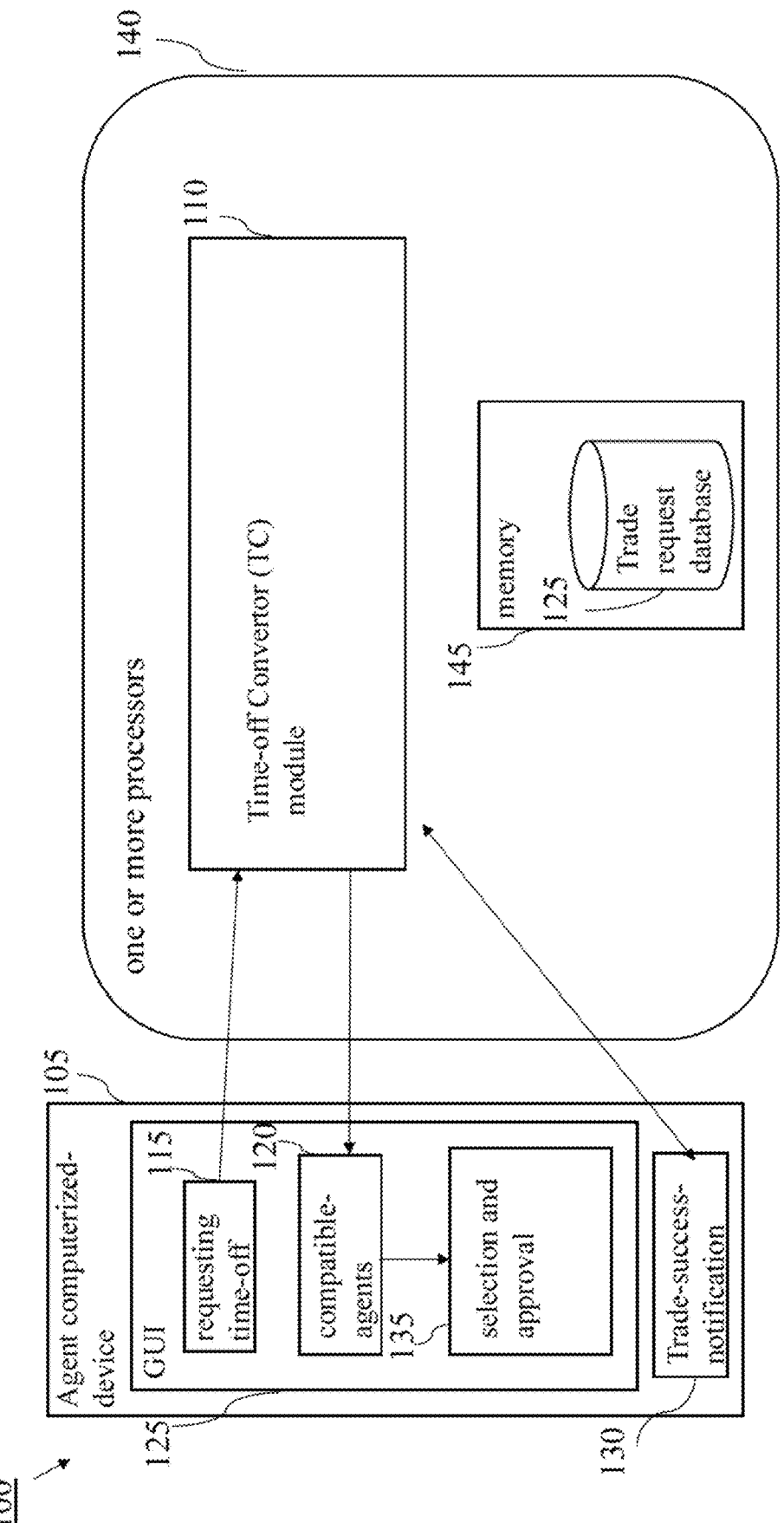
FIG. 1 schematically illustrates a high-level diagram of a system for converting a time-off request of an agent to a shift-trade with another agent or to a self-swap schedule, in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing." "calculating," "determining," "establishing", "analyzing". "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In current systems in contact centers, an agent may request a day-off and a supervisor may either approve or decline the request. Agents are unaware of existing trade requests of shifts of other agents. This information may be necessary when the agents have to take time-off during a scheduled shift and doesn't want to exhaust their vacation balance or any other type of balance.

Therefore, there is a need for a technical solution that may be an alternative for time-off such as trade and swap and operate a search for existing open trade requests of shifts during a preconfigured period. Furthermore, there is a need for a system and method for converting a time-off request of an agent to a shift-trade with another agent or to a self-swap schedule, in a contact center.

The term "Micro Service (MS)" as used herein refers to an instance that is facilitated in an MS architecture which is supporting high availability and auto scaling of computing resources. Each MS is installed inside a docker container such as instance of Amazon's Elastic Compute Cloud (EC2).

The terms database and MS are interchangeable.

FIG. 1 schematically illustrates a high-level diagram of a system 100 for converting a time-off request of an agent to a shift-trade with another agent or to a self-swap schedule, in a contact center, in accordance with some embodiments of the present disclosure.

Figure 3:
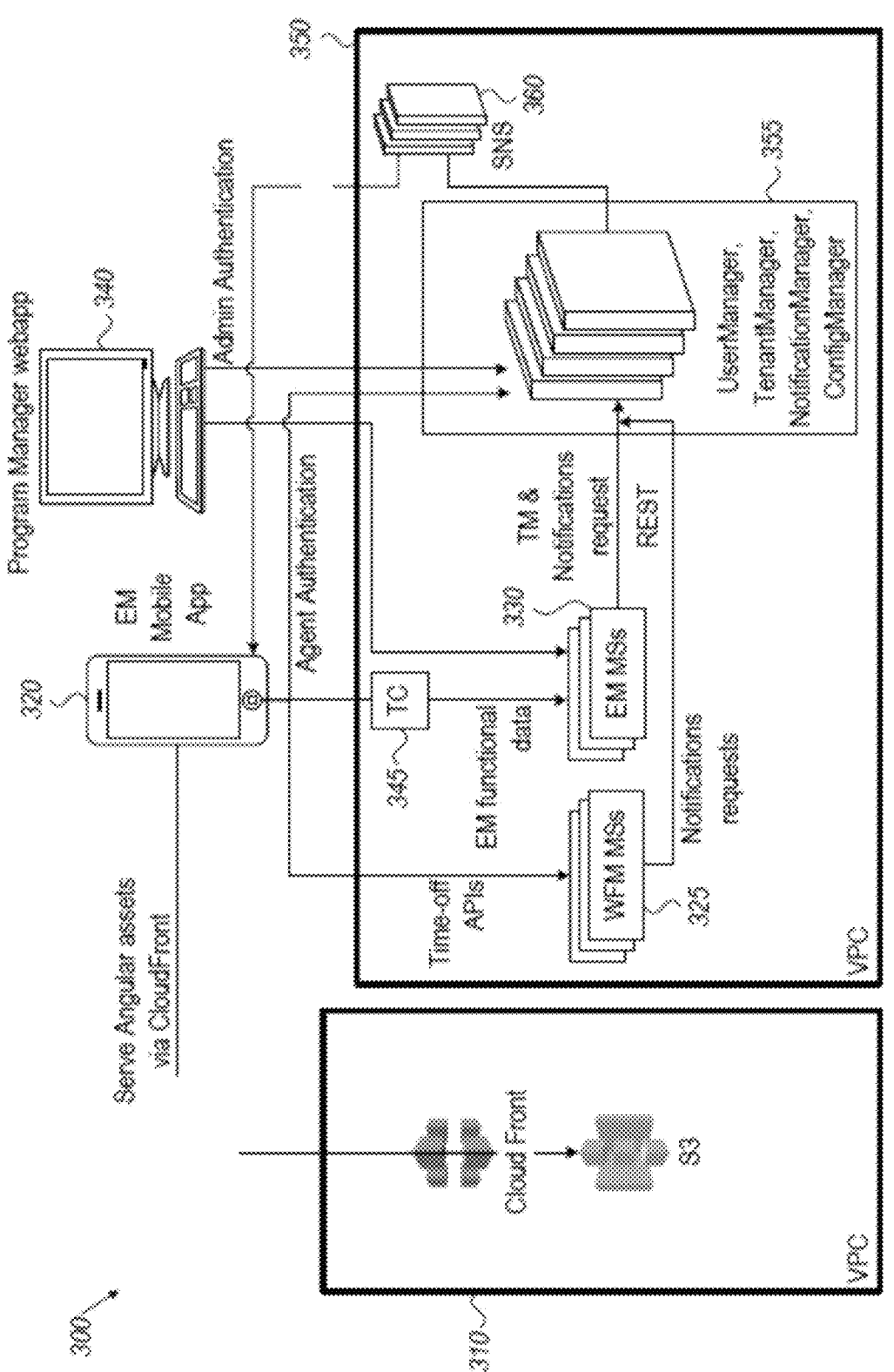
FIG. 3 is a high-level diagram of an example of a system for converting a time-off request of an agent to a shift-trade with another agent or to a self-swap schedule, in a contact center, in accordance with some embodiments of the present disclosure.

According to some embodiments of the present disclosure, in a computerized-system, for converting a time-off request of an agent to a shift-trade with another agent or to a self-swap schedule, in a contact center, such as system 100, upon receiving a time-off request for a specified date via a Graphical User Interface (GUI), such as GUI 125 that is associated with an Engagement Manager (EM) application, as shown in element 330 in FIG. 3, that is running on a computerized-device of a source-agent, such as agent computerized-device 105, one or more processors 140 may be configured to operate a module, such as Time-off Convertor (TC) module 110.

According to some embodiments of the present disclosure, a source-agent is an agent that is sending a time-off request.

According to some embodiments of the present disclosure, the TC module 110 may include searching in a database, such as trade-requests database 125, open trade requests of trading-agents in dates where the source-agent doesn't have any scheduled-shift, during a preconfigured period to yield a list of trading-agents, as shown by highlighted agents in column 510 in FIG. 5. The trade-requests database 125 may be associated with one or more Engagement Manager (EM) Micro Services (MS)s, as shown in element 330 in FIG. 3.

According to some embodiments of the present disclosure, the TC module 110 may further include retrieving compatible-agents, e.g., filtering agents, from the yielded list of trading-agents, who do not have a scheduled-shift in the specified date where the agent is requesting a time-off and there're open trade request from target agents who are willing to offer in return shift on the time-off date and then presenting the compatible-agents 120 to the source-agent, via a display unit associated to the computerized-device of the source-agent.

Figure 4:
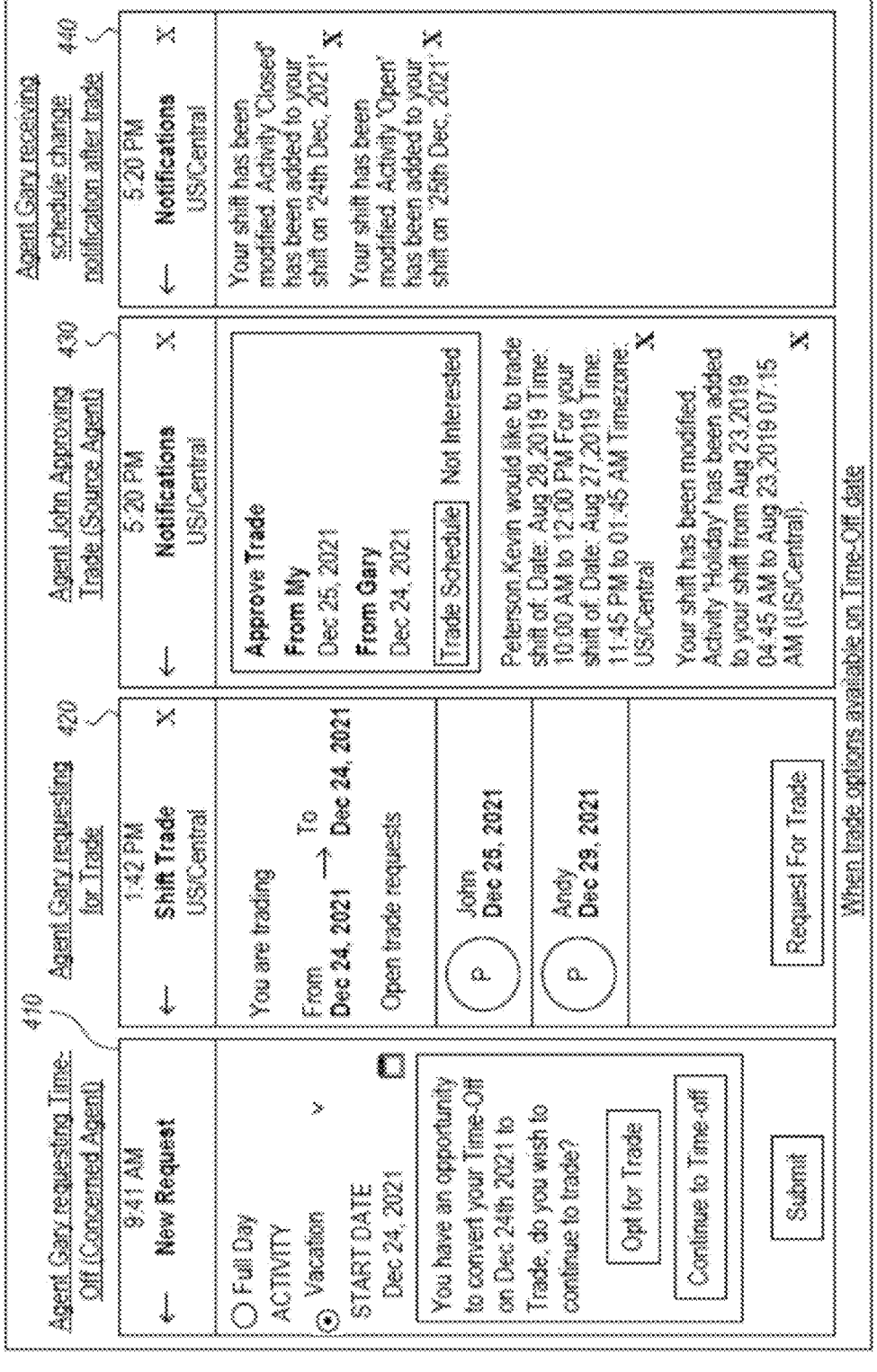
FIG. 4 illustrates a screenshot of Graphical User Interface (GUI) for time-off request process, in accordance with some embodiments of the present disclosure.

According to some embodiments of the present disclosure, the TC module 110 may further include enabling the source-agent a selection of an agent from the presented compatible-agents, as shown by screenshot 420 in FIG. 4, and upon selection of the agent by the source-agent, sending an approval request to the agent and the source-agent 135, via a notification-service component, for example, such as Simple Notification Service (SNS) 360.

According to some embodiments of the present disclosure, upon acceptance of the agent, the TC module 110 may further include sending to the computerized-device of the source-agent 105 and to a computerized-device of the agent (not shown) a trade-success-notification, as shown in element 440 in FIG. 4.

According to some embodiments of the present disclosure, the trade-success-notification, may be sent via a notification-service component, such as SNS 360 to be presented on the display unit (not shown).

According to some embodiments of the present disclosure, the TC module 110 may further include operating a change of scheduled shifts to the source-agent and the agent in one or more Workforce Management (WFM) MSs, as shown in element 325 in FIG. 3.

According to some embodiments of the present disclosure, the EM application that is running on the agent's computerized device may be communicating with one or more EM Micro Service (MS)s, as shown in element 325 in FIG. 3.

According to some embodiments of the present disclosure, optionally, when no compatible-agents have been retrieved, the TC module 110 may be further configured to present to the source-agent, via the display unit, one or more options for selection.

According to some embodiments of the present disclosure, compatible-agents may be agents having preconfigured parameters in the EM application. The preconfigured parameters may be configured via the EMI application such as, for example, same skills as the source-agent, hours of operation i.e., the hours of operation configuration of the agents must fall under the operating hours defined for the respective day of the week. E.g., 10 AM to 10 PM, 8 AM to 8 PM, etc. The hours of operation configuration can be different for both agents if they belong to a different management or business unit. The existing scheduled-shift and new scheduled-shift after trade should always fall within the hours of operation configuration defined for respective management or business unit. Furthermore, both shifts must be within the maximum daily hours, which is less than or equals the maximum daily hours limit.

According to some embodiments of the present disclosure, an option of the one or more options may be schedule-swap of shifts, meaning scheduling the source-agent to another shift. When schedule-swap is selected by the source-agent via the GUI 125, the TC module 110 may comprise searching one or more shifts during a preconfigured period which are understaffed, and the source-agent is not scheduled to and presenting the one or more shifts to the source-agent via the display unit for schedule-swap selection. Upon selection of the source-agent via the GUI 125 the TC module 110 may comprise operating change of shifts to the source-agent in the one or more WFM MSs, as shown by element 325 in FIG. 3.

According to some embodiments of the present disclosure, an option of the one or more options may be to initiate a new trade-request.

According to some embodiments of the present disclosure, an option of the one or more options may be taking time-off. Upon selection of this option by the source-agent via the GUI 125, the TC module 110 may comprise removing the scheduled-shift of the source-agent from the one or more WFM MSs.

According to some embodiments of the present disclosure, the TC module 110 may be enabled or disabled by a user such as a customer admin as per contact center's requirements.

According to some embodiments of the present disclosure, the operation of TC module 110 may introduce a communication link between time-off system and trade-requests system, and a communication link between time-off system and schedule-swap system which using multiple parameters, such as, work/non-work schedule, non-overlapping schedules, same skill, hours of operation, same management unit, same business unit, eligible open trade-requests and schedule-swaps for analysis detection purposes to handle agent time-off request for a particular day.

FIGS. 2A-2B are a high-level workflow of Time-off Convertor (TC) module 200, in accordance with some embodiments of the present disclosure.

According to some embodiments of the present disclosure, operation 210 may comprise, searching in the trade-requests database, open trade requests of trading-agents in dates where the source-agent doesn't have a scheduled-shift, during a preconfigured period to yield a list of trading-agents.

According to some embodiments of the present disclosure, operation 220 may comprise retrieving from the yielded list of trading-agents, compatible-agents who do not have a scheduled-shift in the specified date.

According to some embodiments of the present disclosure, operation 230 may comprise presenting the compatible-agents to the source-agent, via a display unit associated to the computerized-device of the source-agent.

According to some embodiments of the present disclosure, operation 240 may comprise, enabling the source-agent a selection of an agent from the presented compatible-agents and upon selection of the agent by the source-agent, sending an approval request to the agent via a notification-service component. The selection of the agent may be for example via a GUI as shown in screenshot 420 in FIG. 4.

According to some embodiments of the present disclosure, operation 250 may comprise, upon acceptance of the agent, sending to the computerized-device of the source-agent and to a computerized-device of the agent a trade-success-notification, via the notification-service component to be presented on the display unit and operating change of scheduled shifts to the source-agent and the agent in one or more Workforce Management (WFM) MSs. The WFM MSs may be such as WFM MS 325 in FIG. 3. The notification-service component may be for example, Simple Notification Service (SNS) 360.

FIG. 3 is a high-level diagram of an example of a system 300, in accordance with some embodiments of the present disclosure.

According to some embodiments of the present disclosure, upon selection of time-off request e.g., via a GUI of an Engagement Management (EM) mobile application, that is associated to a computerized-device, such as, computerized device 320 of a source-agent, a module, such as TC module 345 and such as TC module 110 in FIG. 1, may be operated.

According to some embodiments of the present disclosure, the TC module 345 may be running in a Virtual Private Cloud (VPC) environment, such as VPC 350 and may be configured by a program manager webapp 340.

According to some embodiments of the present disclosure, component 355 may include user manager, tenant manager, configuration manager and notification manager. The user manager may be used for authentication and authorization of the agents, supervisors logging into a Workforce Management (WFM) application. The tenant manager and configuration manager may be used for adding, updating, and managing tenants in the cloud for WFM application. The notification manager may be used to send notifications to agents computerized device via Simple Notification Service (SNS) 360.

According to some embodiments of the present disclosure, agents in the contact center may select via EM mobile application that is running on a computerized-device 320, a time-off request, as shown in GUI 410 in FIG. 4. The EM mobile application may interact with the WFM MSs 325 and EM MSs 330 to handle the time-off request. A module, such as TC module 110 may convert a time-off request of an agent to a shift-trade with another agent or to a self-swap schedule.

According to some embodiments of the present disclosure, the EM MSs 330 holds all the shift-trade requests which were raised by agents as well as agent's existing scheduled-shifts and weekly day offs. A module, such as TC module in FIG. 1, may communicate with the EM MSs 330 to search for open trade-requests opportunities and available schedule-swap options which are available for an agent that is requesting time-off.

According to some embodiments of the present disclosure, a database, such as trade request database 125 may be used as a datastore for the EM MSs 330.

According to some embodiments of the present disclosure, program manager webapp 340 may be used to configure trade-request by a user such as a supervisor or a manager. For example, the program manager webapp 340 may be used by a user, such as a supervisor or manager, to configure rules for trade-requests for each management or business unit such as, same skill, apply hours of operation, max daily hours etc.

According to some embodiments of the present disclosure, static web content in EM Mobile app 320 and the program manager webapp 340 and static user interface may be available to all users via VPC 310 which includes a storage service, such as Amazon Simple service storage (S3) and Content Delivery Network, such as Amazon Web Services (AWS) CloudFront which is closer to the end user and used to make information available on Amazon S3 in a shorter time.

According to some embodiments of the present disclosure, the EM mobile application that is running on a computerized-device of a source-agent 320 may retrieve EM functional data from EM MSs 330.

According to some embodiments of the present disclosure, the TC module 345 may search in a trade-requests database, open trade requests of trading-agents in dates where the source-agent doesn't have a scheduled-shift, during a preconfigured period to yield a list of trading-agents.

According to some embodiments of the present disclosure, the TC module 345 may retrieve from the yielded list of trading-agents, compatible-agents who do not have a scheduled-shift in the specified date.

According to some embodiments of the present disclosure, then, the TC module 345 may present the compatible-agents to the source-agent, via a display unit associated to the computerized-device of the source-agent 320.

According to some embodiments of the present disclosure, the TC module 345 may enable the source-agent, via the computerized-device 320, a selection of an agent from the presented compatible-agents and upon selection of the agent by the source-agent, via a GUI associated to the computerized-device 320, sending an approval request to the agent via a notification-service component, such as Simple Notification Service (SNS) 360.

According to some embodiments of the present disclosure, upon acceptance of an agent, a trade-success-notification may be sent to the computerized-device of the source-agent 320 and to a computerized-device of the agent, via a notification-service component 360 to be presented on the display unit and the TC module 345 may comprise operating change of scheduled shifts to the source-agent and the agent in one or more Workforce Management (WFM) MSs 325.

FIG. 4 illustrates a screenshot of Graphical User Interface (GUI) 400 for time-off request process, in accordance with some embodiments of the present disclosure.

According to some embodiments of the present disclosure, for example, an agent wants to raise a time-off request on Dec. 24, 2021. The agent doesn't have a scheduled shift on Dec. 25, 2021 and Dec. 29, 2021. A system, such as computerized-system 100 in FIG. 1, may search for open trade-requests of compatible-agents on Dec. 25, 2021, and Dec. 29, 2021.

According to some embodiments of the present disclosure, the agent may select via GUI, such as GUI 410, the activity type, e.g., vacation and the start date, e.g., Dec. 24, 2021. When the system, such as computerized-system 100A may find compatible-agents in a database, such as trade-requests database 125, in FIG. 1, the agent may be presented, via a display unit associated to the agent's computerized-device, a notification as to an opportunity to convert the time-off on Dec. 24, 2021, to trade with another agent and the options to trade or to continue to time-off.

According to some embodiments of the present disclosure, when the agent selects via the GUI the option to trade the time-off with another agent a list of compatible-agents, as shown in element 420.

According to some embodiments of the present disclosure, when the agent selects an agent for the shift trade from the list of compatible-agents, e.g., John on Dec. 25, 2021, an approval request may be sent to John to be displayed via John's computerized-device, such as notification 430.

According to some embodiments of the present disclosure, upon acceptance of the agent, e.g., John, sending to the computerized-device of the source-agent and to a computerized-device of the agent a trade-success-notification, via the notification-service component to be presented on the display unit, e.g., GUI 440.

FIG. 5 shows an example of open trade requests of trading-agents, in accordance with some embodiments of the present disclosure.

According to some embodiments of the present disclosure, in a system, such as computerized-system 100 in FIG. 1 for converting a time-off request of an agent to a shift-trade with another agent or to a self-swap schedule, in a contact center, upon receiving a time-off request for a specified date via a Graphical User Interface (GUI) that is associated with an Engagement Manager (EM) application that is running on a computerized-device of a source-agent, for time-off on Dec. 24, 2021, such as the highlighted agents in column 520 on start time column 530 through end time column 540.

According to some embodiments of the present disclosure, a module, such as TC module 110 in FIG. 1 and such as TC module 200 in FIGS. 2A-2B, may comprise searching in a database, such as trade-requests database 125 in FIG. 1, open trade requests of trading-agents in dates where the source-agent doesn't have a scheduled-shift 125 in FIG. 1, during a preconfigured period to yield a list of trading-agents such as the highlighted agents in column 510 on Dec. 25, 2021 or Dec. 29, 2021.

Figure 6:
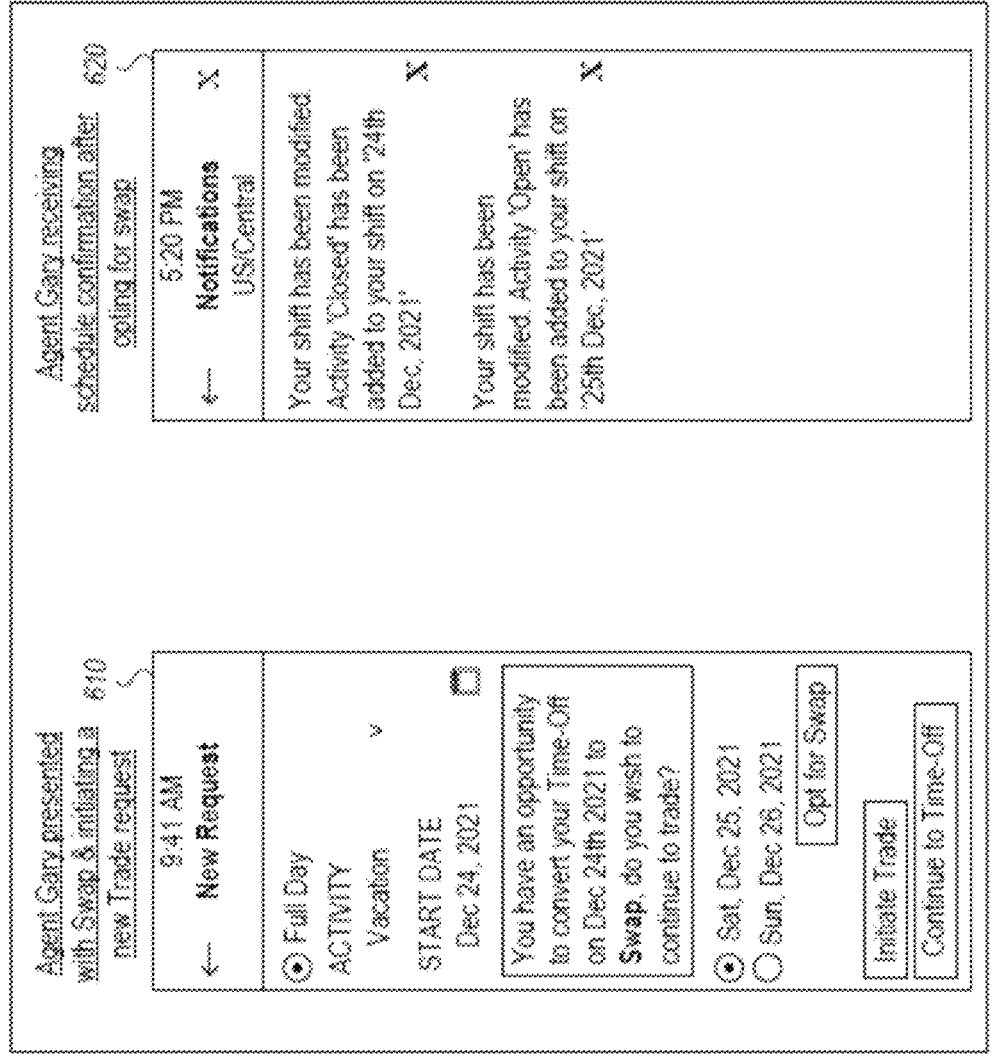
FIG. 6 illustrates a screenshot of GUI for schedule-swap selection, in accordance with some embodiments of the present disclosure.

FIG. 6 illustrates a screenshot of GUI for schedule-swap selection 600, in accordance with some embodiments of the present disclosure.

According to some embodiments of the present disclosure, in a system such as computerized-system 100 in FIG. 1 for converting a time-off request of an agent to a shift-trade with another agent or to a self-swap schedule, in a contact center, upon receiving a time-off request for a specified date via a Graphical User Interface (GUI), such as GUI 125 in FIG. 1, that is associated with an Engagement Manager (EM) application that is running on a computerized-device of a an agent, such as a source-agent, for time-off on Dec. 24, 2021, then when no compatible-agents have been retrieved, a module, such as TC module 110 in FIG. 1, may be further configured to present to the source-agent via the display unit one or more options for selection as shown by GUI610. The options may be swap-schedule, initiate a new trade-request, e.g., with other parameters, or to continue and apply for a time-off on Dec. 24, 2021.

According to some embodiments of the present disclosure, an option of the one or more options may be a schedule-swap of shifts and when schedule-swap is selected by the source-agent via the GUI, searching one or more shifts during a preconfigured period which are understaffed and the source-agent is not scheduled to and presenting the one or more shifts to the source-agent via the display unit for schedule-swap selection and upon selection of the source-agent via the GUI, as shown by screenshot 620, operating change of shifts to the source-agent in the one or more WFM MSs, such as WFM MS 325 in FIG. 3.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-system for converting a time-off request of an agent to a shift-trade with another agent or to a self-swap schedule, in a contact center, the computerized-system comprising:

one or more processors, a trade-requests database and a memory to store the database thereon, said trade-requests database is associated with one or more Engagement Manager (EM) Micro Services (MS) s, upon receiving a time-off request for a shift in a specified date via a Graphical User Interface (GUI) of an Engagement Manager (EM) mobile application that is running on a computerized-device of a source-agent, wherein a source-agent is an agent that is sending a time-off request, for the shift in the specified date, said one or more processors are configured to:

(i) search in the trade-requests database, open trade requests of trading-agents in dates, other than the specified date, where the source-agent doesn't have a scheduled-shift, during a preconfigured period to yield a list of trading-agents;

(ii) retrieve from the yielded list of trading-agents, compatible-agents who do not have a scheduled-shift in the specified date;

(iii) present the compatible-agents to the source-agent, via the GUI on a display unit associated to the computerized-device of the source-agent;

(iv) configure the GUI of the EM mobile application to enable the source-agent a selection of an agent from the presented compatible-agents and upon selection of the agent by the source-agent via the GUI of the EM mobile application, sending an approval request to the agent via a notification-service component;

(v) upon acceptance of the approval request by the agent via the GUI of the EM mobile application, send to the computerized-device of the source-agent and to a computerized-device of the agent a trade-success-notification, via the notification-service component to be presented on the display unit and operating change of scheduled shifts to the source-agent and the agent in one or more Workforce Management (WFM) MSs, such that the agent is scheduled to the shift in the specified date and the source-agent is scheduled to the scheduled-shift of the agent, wherein said EM mobile application is communicating with one or more EM MSs, (vi) when no compatible-agents have been retrieved, present via the GUI on the display unit to the source-agent schedule-swap of shifts for selection;

(vii) upon selection of the schedule-swap of shifts by the source-agent via the GUI of the EM mobile application, search one or more shifts during a preconfigured period which are understaffed and the source-agent is not scheduled to and present the one or more shifts to the source-agent via the GUI on the display unit for schedule-swap selection; and (viii) upon selection of the source-agent via the GUI of the EM mobile application, of a shift from the one or more shifts, which are understaffed, operate change of shifts to the source-agent in the one or more WFM MSs from the shift in the specified date to the selected shift.

2. The computerized-system of claim 1, wherein compatible-agents are agents having preconfigured parameters in the EM mobile application.

3. The computerized-system of claim 1, wherein an option of the one or more options is to initiate a new trade-request.

4. The computerized-system of claim 1, wherein an option of the one or more options is taking time-off, and wherein upon selection of the source-agent via the GUI of the EM mobile application, removing the scheduled-shift from the one or more WFM MSs.

5. A computerized-method for converting a time-off request of an agent to a shift-trade with another agent or to a self-swap schedule, in a contact center, the computerized-method comprising:

upon receiving a time-off request for a shift in a specified date via a Graphical User Interface (GUI) of an Engagement Manager (EM) mobile application that is running on a computerized-device of a source-agent, wherein a source-agent is an agent that is sending a time-off request, for the shift in the specified date, operating a Time-off Convertor (TC) module, said operating the TC module comprising executing, by the computerized device:

(i) searching in a trade-requests database open trade requests of trading-agents in dates, other than the specified date, where the source-agent doesn't have a scheduled-shift, during a preconfigured period to yield a list of trading-agents;

(ii) retrieving from the yielded list of trading-agents, compatible-agents who do not have a scheduled-shift in the specified date;

(iii) presenting the compatible-agents to the source-agent, via a display unit associated to the computerized-device of the source-agent;

(iv) configuring the GUI of the EM mobile application to enable the source-agent a selection of an agent from the presented compatible-agents and upon selection of the agent by the source-agent via the GUI of the EM mobile application, sending an approval request to the agent via a notification-service component; and (v) upon acceptance of the approval request by the agent via the GUI of the EM mobile application, sending to the computerized-device of the source-agent and to a computerized-device of the agent a trade-success-notification, via the notification-service component to be presented on the display unit and operating change of scheduled shifts to the source-agent and the agent in the one or more Workforce Management (WFM) MSs, such that the agent is scheduled to the shift in the specified date and the source-agent is scheduled to the scheduled-shift of the agent, wherein said EM mobile application is communicating with one or more EM MSs, (vi) when no compatible-agents have been retrieved, presenting via the GUI on the display unit to the source-agent schedule-swap of shifts for selection;

(vii) upon selection of the schedule-swap of shifts by the source-agent via the GUI of the EM mobile application, searching one or more shifts during a preconfigured period which are understaffed and the source-agent is not scheduled to and presenting the one or more shifts to the source-agent via the GUI on the display unit for schedule-swap selection; and (viii) upon selection of the source-agent via the GUI of the EM mobile application, of a shift from the one or more shifts, which are understaffed, operating change of shifts to the source-agent in the one or more WFM MSs from the shift in the specified date to the selected shift.

6. The computerized-method of claim 5, wherein compatible-agents are agents having preconfigured parameters in the EM application.

7. The computerized-method of claim 5, wherein an option of the one or more options is to initiate a new trade-request.

8. The computerized-method of claim 5, wherein an option of the one or more options is taking time-off, and wherein upon selection of the source-agent via the GUI of the EM mobile application, removing the scheduled-shift from the one or more WFM MSs.

9. The computerized-method of claim 5, wherein the TC module is configured to be enabled or disabled.

* * * * *